(12) United States Patent
Yamauchi et al.

(10) Patent No.: US 6,713,975 B2
(45) Date of Patent: Mar. 30, 2004

(54) LIGHTING APPARATUS, LIGHTING CONTROL SYSTEM AND HOME ELECTRIC APPLIANCE

(75) Inventors: Tatsumi Yamauchi, Hitachiota (JP); Fumio Murabayashi, Urizura (JP); Haruki Komatsu, Ichikawa (JP); Akio Inada, Hinode (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 09/915,365

(22) Filed: Jul. 27, 2001

(65) Prior Publication Data

US 2002/0050799 A1 May 2, 2002

(30) Foreign Application Priority Data

Nov. 2, 2000 (JP) ........................................ 2000-340370

(51) Int. Cl.$^7$ ................................................. G05F 1/00
(52) U.S. Cl. ........................ 315/308; 315/294; 315/312
(58) Field of Search ................................. 315/312–319, 315/292–295, 149, 150, 154, 155, 158, 159, 307, 308; 362/233

(56) References Cited

U.S. PATENT DOCUMENTS

| | | | | |
|---|---|---|---|---|
| 4,733,138 A | * | 3/1988 | Pearlman et al. | ........... 315/307 |
| 5,059,871 A | * | 10/1991 | Pearlman et al. | ........... 315/316 |
| 5,293,097 A | * | 3/1994 | Elwell | ........................ 315/154 |
| 5,352,957 A | * | 10/1994 | Werner | ........................ 315/291 |
| 5,675,221 A | | 10/1997 | Yoo et al. | ..................... 315/291 |
| 5,769,527 A | * | 6/1998 | Taylor et al. | .................. 362/85 |
| 6,160,359 A | * | 12/2000 | Fleischmann | ................ 315/294 |
| 6,175,201 B1 | * | 1/2001 | Sid | ............................. 315/312 |
| 6,181,086 B1 | * | 1/2001 | Katyl et al. | ................... 315/307 |

FOREIGN PATENT DOCUMENTS

| | | | |
|---|---|---|---|
| JP | 2-66877 | 3/1990 | ........... H05B/37/02 |
| JP | 5-89969 | 4/1993 | ........... H05B/37/02 |
| JP | 10223378 | 8/1998 | ........... H05B/37/02 |
| JP | 10-275685 | 10/1998 | ........... H05B/37/02 |
| JP | 2000-12246 | 1/2000 | ........... H05B/37/02 |
| WO | WO 99/39419 | 8/1999 | ............ H02H/7/32 |

OTHER PUBLICATIONS

European Search Report in Application No. EP 01 11 8798 mailed Mar. 18, 2002.

* cited by examiner

*Primary Examiner*—Hoang V. Nguyen

(57) ABSTRACT

A lighting apparatus capable of improving amenity and energy-saving and controlling a lighting load as a user intends to do. The lighting apparatus is connected to a network and controlling the lighting load corresponding to information from the network, and the lighting apparatus further comprises an automatic mode for controlling the lighting load corresponding to the information from the network, a manual mode for controlling the lighting load independently of the information from the network, and a switching means for switching between the automatic mode and the manual mode.

20 Claims, 14 Drawing Sheets

FIG. 3

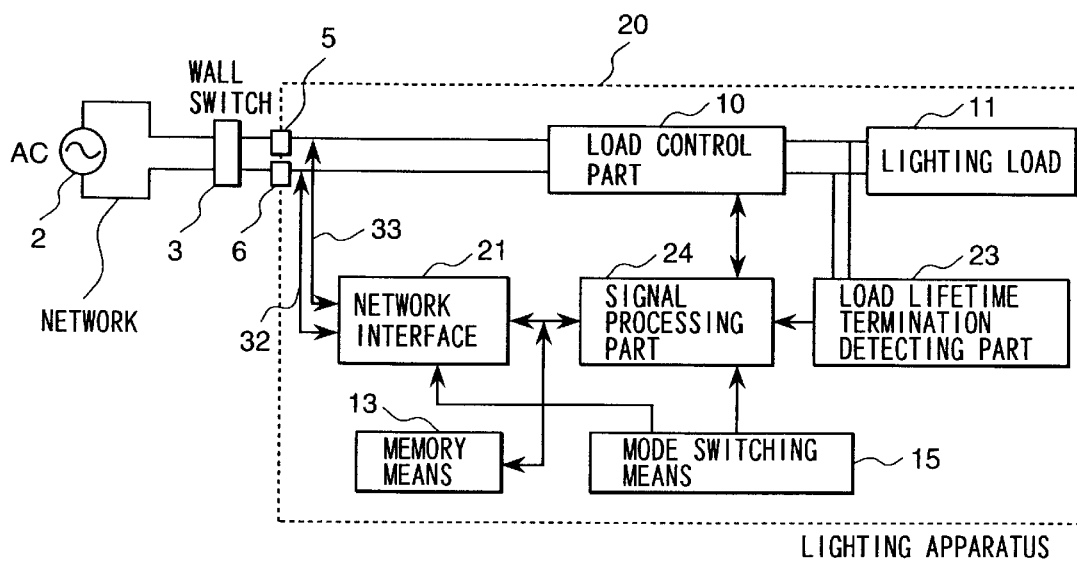

FIG. 4

| INFORMATION RECEIVED FROM NETWORK | INFORMATION SENT TO NETWORK |
|---|---|
| • CONTROL INFORMATION FROM CONTROLLER<br>• STATES OF VARIOUS KINDS OF SENSORS<br>• CONTROL INFORMATION FROM VARIOUS KIND OF SENSORS<br>• STATES OF VARIOUS KINDS OF ELECTRICAL HOUSEHOLD APPLIANCES<br>• CONTROL INFORMATION FROM VARIOUS KINDS OF ELECTRICAL HOUSEHOLD APPLIANCES<br>• LIGHTING CONTROL PROGRAM<br>• LIGHTING CONTROL DATA (FLASHING PATTERN, SOUND PATTERN, TIME INFORMATION, ETC.) | • INFORMATION FOR SETTING OPERATING MODE (AUTO, MANUAL)<br>• STATE OF LIGHTING LOAD (ON, OFF, 50% LIGHTING ADDJUSTMENT, ETC.)<br>• DETECTED SIGNAL OF LIGHTING LOAD LIFETIME TERMINATION<br>• AMOUNT OF POWER COMSUMPTION ON LIGHTING SYSTEM<br>• STATE OF SENSOR CONTAINED IN LIGHTING SYSTEM<br>• CONTENTS STORED IN BUILT-IN MEMORY<br>• LIGHTING CONTROL PROGRAM |

LIGHTING APPARATUS, LIGHTING CONTROL SYSTEM AND HOME ELECTRIC APPLIANCE

BACKGROUND OF THE INVENTION

The present invention relates to a lighting apparatus in which lighting equipment, sensors and home electric appliances are connected using a network to perform linked operation, and to a lighting control system and a home electric appliance relating to the lighting apparatus.

In addition to a lighting apparatus in which on/off control is performed individual lighting loads, there exists a lighting apparatus in which a plurality of home electric appliances are connected to a network using a dedicated line to perform group control of on/off switching of and lighting adjustment of the home electric appliances. In recent years, attempt has been made to make a lighting apparatus intelligent, as described above. Particularly, in a lighting control system for a building, it is becoming possible to perform centralized control of on/off switching of and lighting adjustment of lighting equipment in the building.

On the other hand, in addition to a home lighting apparatus which performs on/off control and lighting adjustment control of individual lighting loads, there exists a lighting apparatus which performs on/off control of and lighting adjustment control of lighting equipment in combination with a sensor connected to the lighting apparatus. By doing so, energy saving can be attained by combining the lighting apparatus with the sensor. However, it is difficult to find a lighting apparatus which performs centralized control of home lighting equipment or performs intelligent control by connecting the lighting equipment to a network.

Japanese patent application laid-open publication No. Hei 10-275685 discloses a lighting apparatus in which lighting equipment is connected to a network to perform lighting control using a centralized control unit connected to the network and to perform lighting adjustment control by linking with a sensor. In this conventional example, on/off control and lighting adjustment control are performed by the main control unit through the network. Further, it is possible to perform lighting control by linking with the sensor.

Relating systems of this kind are disclosed, for example, in Japanese patent application laid-open publication No. Hei 5-89969, Japanese patent application laid-open publication No. Hei 2-66877, Japanese patent application laid-open publication No. 2000-12246 and U.S. Pat. No. 5,675,221.

According to the conventional technologies described above, it is described that usability of a user can be improved by connecting the controller, the lighting equipment and the sensor using the network to perform the lighting control through the network. However, each of the conventional technologies has a system structure mainly aiming at a system for building use to control all the lighting apparatus together, and does not take it into consideration to elaborately control the lighting apparatus aiming at home use.

In order to widely apply a network-controllable lighting apparatus to home use in the future, it is necessary to solve the following problems (a) to (g).
(a) Amenity and energy saving can be attained by connecting the system using a network.
(b) The lighting apparatus can be controlled as a user intends in liking of the user, a change of scene, a trouble in the network or the device or an action in case of an emergency.
(c) The lighting apparatus can be easily operated.
(d) An increase in the power consumption of the peripheral circuits caused by the networking can be suppressed as low as possible.
(e) The system should be made by taking it into consideration to cooperate with a wall switch dedicated to the lighting apparatus control.
(f) The system should be so flexible that the system may be constructed by additionally purchasing a network-ready home electric appliance or sensor at necessary time and by necessary amount.
(g) The home electric appliance can be easily connected to the network without additional new work not only in a newly built house but in an existing house.

The conventional technologies may materialize the item (a), but do not sufficiently take the items (b) to (e) into consideration. Particularly, the networking of the lighting apparatus provides the user with convenience, but operation of the system does not always make all the users having different liking comfortable and sometimes makes the users uncomfortable. Further, in case of an emergency, the lighting apparatus must be turned on according to the user's intention at once different from the other home electric appliances. This is because life of the user will be jeopardized unless the lighting equipment is turned on.

On the other hand, the items (f) and (g) are already proposed in the Standardization Committee of Home Network. In order to introducing the system to an existing house, use of lighting wiring or wireless has been discussed.

SUMMARY OF THE INVENTION

An object of the present invention is to materialize at least one of the above items (b) to (e).

Namely, an object of the present invention is to realize at least one of the above items, which are (b) the lighting apparatus can be controlled as a user intends in liking of the user, a change of scene, a trouble in the network or the device or an action in case of an emergency, (c) the lighting apparatus can be easily operated, (d) an increase in the power consumption of the peripheral circuits caused by the networking can be suppressed as low as possible, and (e) the system should be made by taking it into consideration to cooperate with a wall switch dedicated to the lighting apparatus control.

In order to solve the above problems, the present invention is a lighting apparatus connected to a network and controlling a lighting load corresponding to information from the network, which comprises an automatic mode for controlling the lighting load corresponding to the information from the network, a manual mode for controlling the lighting load independently of the information from the network, and a switching means for switching between the automatic mode and the manual mode.

Further, the lighting apparatus is capable of communicating state information inside the lighting apparatus to said network.

Furthermore, the lighting apparatus comprises a memory means for storing a signal from the network.

BRIEF DESCRIPTION OF DRAWINGS

FIG. 3 is a block diagram showing a third embodiment of a lighting apparatus in accordance with the present invention;

FIG. 4 is a table showing an example of various kinds of information which are sent and received by the network-ready lighting apparatus in accordance with the present invention;

DESCRIPTION OF THE INVENTION

Figure 1:
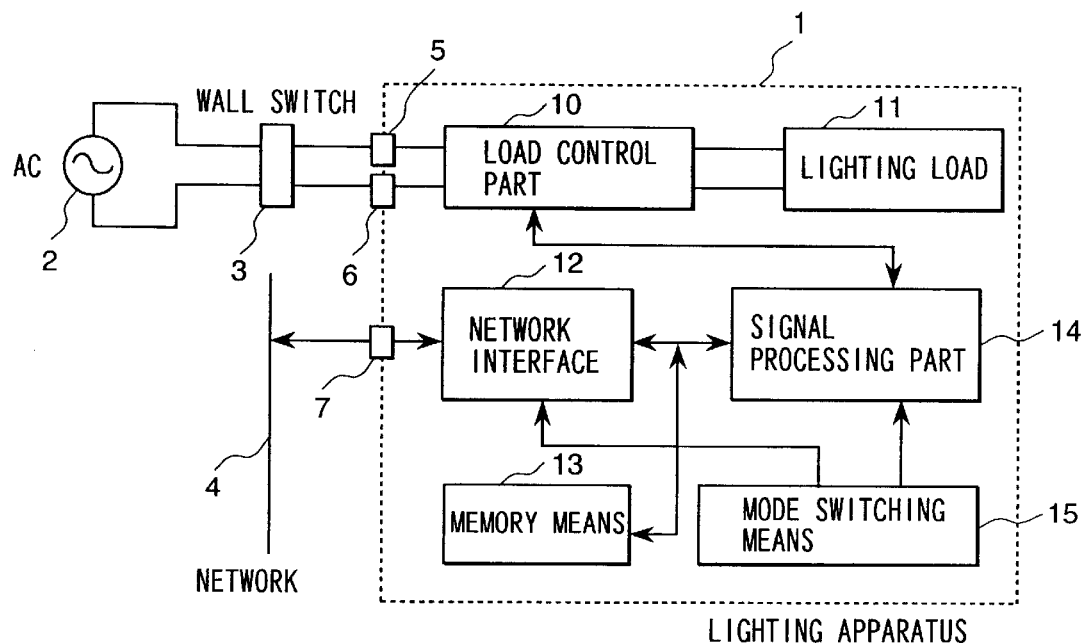
FIG. 1 is a block diagram showing a first embodiment of a lighting apparatus in accordance with the present invention.

Embodiments of the present invention will be described below, referring to the accompanied figures. Like parts in each of the figures are identified by the same reference character.

FIG. 1 is a block diagram showing a first embodiment of a lighting apparatus in accordance with the present invention. In the figure, the reference character 1 is a network-ready lighting apparatus, the reference character 2 is an electric power supply, the reference character 3 is a wall switch, the reference character 4 is a network for performing communication, the reference characters 5 and 6 are electric power supply terminals to the lighting apparatus, the reference character 7 is a connecting terminal to the network, and the reference character 10 is a load control part which controls a lighting load 11. The reference character 11 is the lighting load which is constructed of, for example, a lamp and so on. The reference character 12 is a network interface circuit which transmits information between the lighting apparatus 1 and the network 4. The network interface circuit 12 is composed of a transceiver part for sending and receiving signals to and from the network, a protocol processing part and so on.

The reference character 13 is a memory means which stores information from the network, various kinds of data and programs for controlling the lighting apparatus, and state information inside the lighting apparatus. The reference character 14 is a signal processing part which contains a microcomputer or the like to control each of the components inside the lighting apparatus such as the load control part 10 by processing signals from the network interface circuit 12 and information and data from the memory means 13.

The reference character 15 is a switching means which switches an automatic mode to operate the lighting apparatus by linking with information from the network, an on/off mode to independently operate the lighting apparatus irrespectively of the information from the network and a manual mode to perform lighting adjustment operation of the lighting apparatus from one to another. The automatic mode here means a mode that on/off control and lighting adjustment control of the lighting apparatus are performed by linking with information from the network. The manual mode means a mode that on/off control and lighting adjustment control are manually performed using a remote controller or a switch provided in the lighting apparatus regardless of the information from the network.

A mode switching means 15 is composed of, for example, a remote controller using infrared rays and a switch with code attached directly to the lighting apparatus.

Operation and effects of the lighting apparatus of FIG. 1 will be described below. As the wall switch 3 is switched on to supply electric power to the electric power supply terminals 5, 6, the lighting apparatus 1 is brought into an operation-ready state. This is because the electric power has been supplied from the electric power supply terminals 5, 6 to the various kinds of components in the lighting apparatus 1.

The signal processing part 14 receives data from the network interface circuit 12, data from the memory means 13 and a set mode from the mode switching means 15, and controls the load control part 10 according to set control algorithm to change a state of the lighting load. Here, the change of the state of the lighting load means change of a light intensity of the lighting load, flushing rhythm, lighting color or the like.

According to the present embodiment, the lighting apparatus 1 controls the lighting load 11 according to states and instructions of another lighting apparatus, sensors such as a lighting sensor, a man detecting sensor, and home electric appliances connected to the network 4. For example, when information of detecting presence of a man is transmitted from the man detecting sensor to the lighting apparatus 1 through the network 4, the signal processing part 14 controls the load control part 10 to turn on the lighting load 11.

Further, the lighting apparatus 1 can also output information to the network 4. For example, an on/off state and a light intensity of the lighting load, a state of the mode switching means (for example, automatic mode or manual mode) and so on are output to the network 4 through the network interface circuit 12. By receiving the information described above, it is possible to use the information, for example, to display the state of the lighting apparatus 1 on a controller connected to the network 4, or to control operations of the other home electric appliances connected to the network 4.

Furthermore, by providing the mode switching means in the lighting apparatus connected to the network, the lighting apparatus can be controlled as a user intends in liking of the user, a change of scene, a trouble in the network or the device or an action in case of an emergency. Thereby, operability of the user can be improved.

Although energy saving and amenity can be attained by the automatic mode operation in the network linking, the user may sometimes feel uncomfortable. For example, there happens a situation in which the user want to operate the lighting apparatus depending on the circumstance in liking of the individual user, a change of scene, a trouble in the network or the device or an action in case of an emergency. In such a case, it is important that the lighting apparatus can be controlled as the intention of the user by manual control. Particularly, in a case where the user want to immediately turn on a lighting lamp in occurrence of an emergency at night, it is earlier and more reliable to manually turn on a lighting lamp placed at a near position than to turn on a lighting apparatus through the network control using a controller or the like. In a case where the lighting lamp is not immediately turned on under that situation, there is possibility of occurring a problem of life and death.

Further, according to the present embodiment, a network traffic can be reduced by providing the memory means for network information in the lighting apparatus. That is, in a case where the operating mode of the lighting apparatus is frequently switched, there is no need of periodical monitoring such as fetching of states of the other home electric appliances connected to the network ever time when the operating mode is shifted from the manual mode to the automatic mode.

This is because the memory means in the lighting apparatus always stores network information in the memory means contained in the lighting apparatus even during manual operation. When operation mode is shifted from the manual mode to the automatic mode, the lighting apparatus initially controls the lighting apparatus using the information of the memory means.

Further, according to the present embodiment, since electric power supply to the lighting apparatus can be cut by switching off the wall switch, the lighting apparatus can be used without dissatisfaction by a user who worries about electric power consumption of the lighting apparatus during standby. That is, number of communication times can be reduced, and accordingly an amount of electric power consumption of peripheral circuits accompanied by networking can be reduced. Detail of operation of the lighting apparatus at switching the wall switch on/off is to be described later in detail after FIG. 5.

When the wall switch is once switched off and then switched on again, the lighting apparatus newly collects network information. This is equivalent to the operation that the memory means essentially storing the network information is reset. Switching-off of the wall switch provides the user who worries about increasing of electric power consumption during standby due to networking with a means for decreasing of electric power consumption during standby due to networking.

For a user who wants to receive the benefits of convenience and energy-saving by linking the lighting apparatus with the network, the object can be attained by using the lighting apparatus in keeping the wall switch always switching on.

Figure 2:
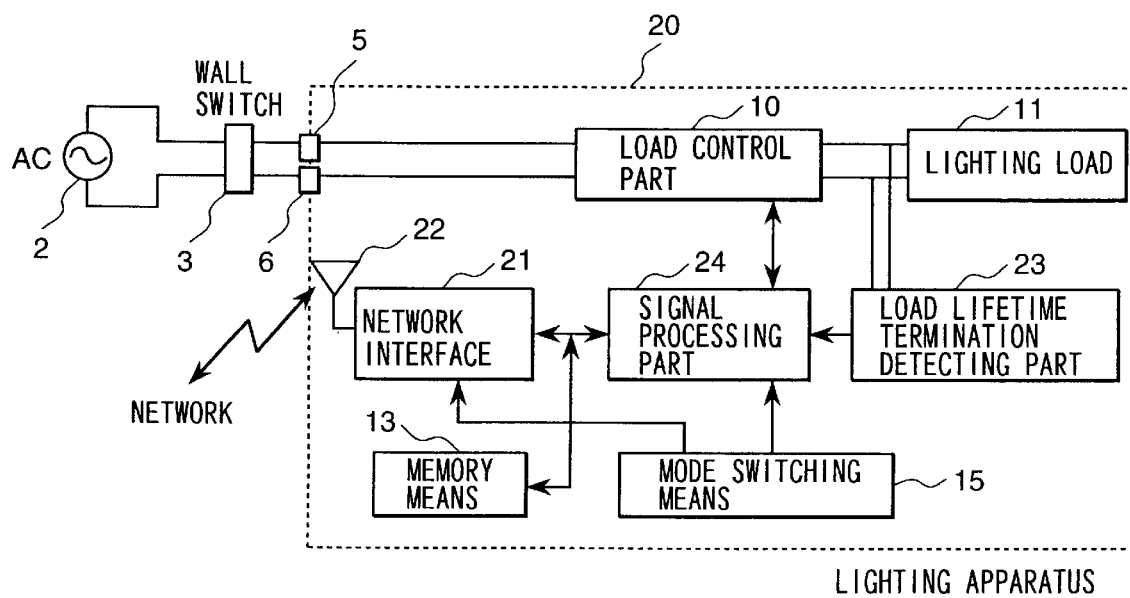
FIG. 2 is a block diagram showing a second embodiment of a lighting apparatus in accordance with the present invention.

FIG. 2 is a block diagram showing a second embodiment of a lighting apparatus in accordance with the present invention. Compared to the embodiment of FIG. 1, the second embodiment is characterized by the point that wireless is used as the communication medium for the network.

In the figure, the reference character 20 is a network-ready lighting apparatus using wireless as the communication medium, the reference character 21 is a network interface circuit in a case of using wireless for the communication medium, and the reference character 22 is an antenna. The network interface circuit 21 is composed of a wireless communication part and a communication protocol processing part. The reference character 23 is a load lifetime termination detecting part which detects a lifetime termination of a lighting load by monitoring a voltage and a current between the lighting load 11.

The reference character 24 is a signal processing part which contains a microcomputer or the like to process signals from the network interface circuit 21, data from the memory means 13, a signal from the load lifetime termination detecting part 23, a signal from the mode switching means 15 and so on, and to control the load control part 10, the network interface circuit 21 and the memory means 13.

According to the present embodiment, since the wireless is used as the communication medium for the network, there is the effect that the network-ready lighting apparatus can be installed in an existing house without special work. The network-read lighting apparatus can be easily installed without limitation of choosing a place as far as it is within a range communicable by the wireless.

Further, since the load lifetime termination detecting part is provided, there is the effect that a state of the lighting load can be transmitted to the network side, and accordingly a lighting load lifetime of each lighting apparatus can be remotely monitored, for example, from a controller.

FIG. 3 is a block diagram showing a third embodiment of a lighting apparatus in accordance with the present invention. Compared to the embodiment of FIG. 2, the third embodiment is characterized by the point that the power line is used as the communication medium for the network.

In the figure, the reference character 30 is a network-ready lighting apparatus using power line as the communication medium, the reference character 31 is a network interface circuit in a case of using the power line as the communication medium, and the reference characters 32 and 33 are signal lead wires from the electric power supply terminals 5, 6 to the lighting apparatus 30 to the network interface circuit 31.

According to the present embodiment, since the electric power supply line is used as the communication medium for the network, there is the effect that the network-ready lighting apparatus can be installed in an existing house without special work. The network-read lighting apparatus can be easily installed at a position where the electric power line is installed.

FIG. 4 is a table showing an example of various kinds of information which are sent and received by the network-ready lighting apparatus in accordance with the present invention.

By using these kinds of information for control by sending and receiving the information to and from the other lighting apparatus, various kinds of sensors and home electric appliances other than the lighting apparatuses, it is possible to improve energy-saving of the home electric appliances including the lighting apparatus and to improve amenity of the user.

Further, the system can be applied to maintenance of machines, welfare, protection of disasters, security and so on. Furthermore, by rewriting a lighting control program through the network, the system can cope with the functional version-up.

Figure 5:
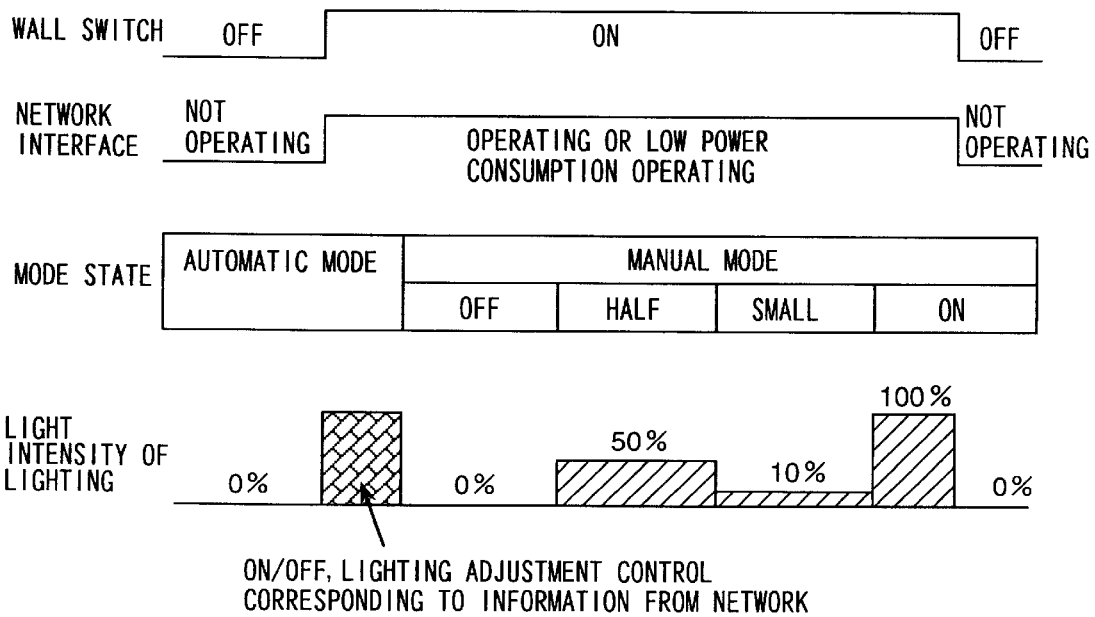
FIG. 5 is an explanatory chart showing a first embodiment of linked operation of the network-ready lighting apparatus.

FIG. 5 is an explanatory chart showing a first embodiment of linked operation of the network-ready lighting apparatus.

The network interface circuit in the lighting apparatus is switched between the operating state and the not-operating state by linking with on/off of the wall switch. The network interface circuit may be shifted to a low power consumption operating state during operating. When the network interface circuit receives any starting signal from the network side, the network interface circuit is shifted from the low power consumption operating state to the operating state.

FIG. 5 shows an example in which the mode state is switched from the automatic mode to the manual mode. In the example, the manual mode has an off, a half, a small and an on sub-modes.

Further, in this case, the mode switching means is assumed to be switching, for example, by a mechanical switch which operates so that the mode state may not changed when the electric power supply to the lighting apparatus is extinguished by switching off the wall switch.

A light intensity of lighting is operated as shown in FIG. 5 depending on combination of the on/off state of the wall switch and the mode state. That is, in the case where the wall switch is off, the light intensity of lighting becomes 0% because electric power is not supplied to the lighting apparatus. In the case where the wall switch is on, the light intensity of lighting is controlled by on/off control or lighting adjustment control corresponding to the information from the network. The lighting control program in this case is stored in the memory means in the lighting apparatus.

In the manual off mode, the light intensity of lighting becomes 0% by switching on the wall switch. In the manual half mode, the light intensity of lighting becomes 50% by switching on the wall switch. In the manual small mode, the light intensity of lighting becomes 10% by switching on the wall switch. In the manual on mode, the light intensity of lighting becomes 100% by switching on the wall switch.

At that time, the made switching means for switching the mode state may be a switch such as a mechanical rotary switch which sequentially changes the mode state every pulling of a code. Further, the switching means may be constructed so that the mode state can be electronically and directly selected by operating a button in a remote controller or the like.

The combination of the off, the half, the small and the on sub-modes in the manual mode shown above is only an example. The order of the sub-modes and addition and deletion of the sub-modes can be freely set. In addition, there is no limitation in the correspondences of the half mode to 50% light intensity, the small mode to 10% light intensity and so on either. It is possible to freely set the correspondences such as the half mode to 60% light intensity, the small mode to 5% light intensity, and so on.

Figure 6:
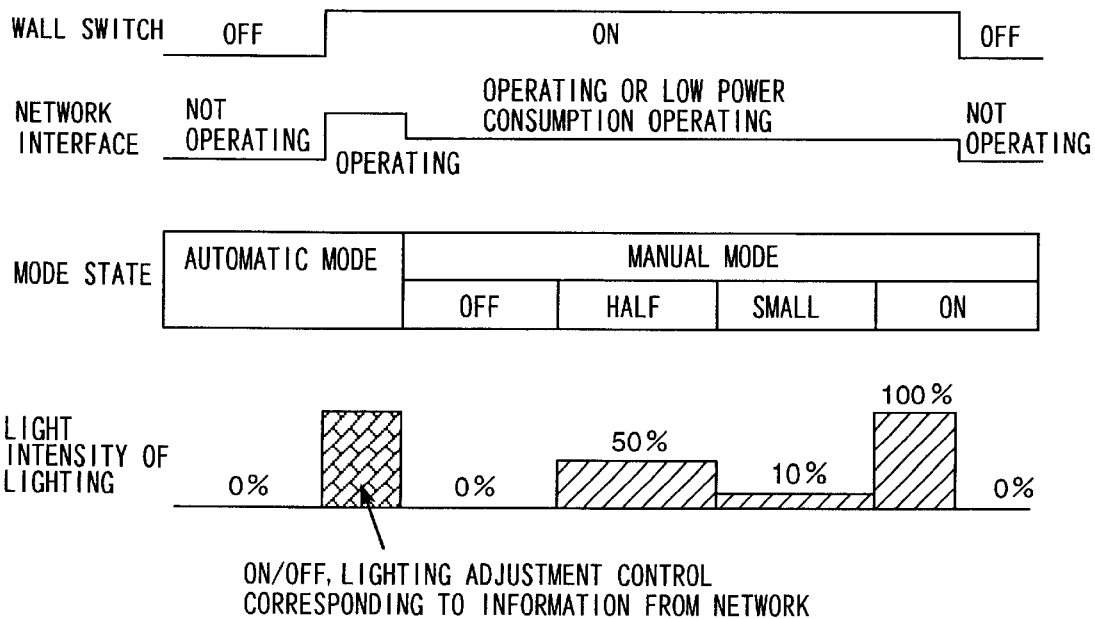
FIG. 6 is an explanatory chart showing a second embodiment of linked operation of the network-ready lighting apparatus.

FIG. 6 is an explanatory chart showing a second embodiment of linked operation of the network-ready lighting apparatus. A different point of this embodiment from FIG. 5 is operation of the network interface circuit.

In FIG. 6, the network interface circuit performs switching of operating/low power consumption operating/not-operating states by linking with the on/off operation of the wall switch and the mode states of automatic/manual modes.

That is, the network interface circuit is in the not-operating state when the wall switch is off. The network interface circuit is in the operating state when the wall switch is on and the mode state is in the automatic mode operation. The network interface circuit is in the low power consumption operating state when the wall switch is on and the mode state is in the manual mode operation.

As a method of operating the network interface circuit in the low power consumption operating state, there is an idea, for example, that operating speed of a circuit inside the network interface circuit is made slow to decrease the power consumption. In this case, the network interface circuit is capable of performing communication.

According to the present embodiment, there is an effect that in the case where the lighting apparatus is used in the manual mode, the electric power consumption of the network interface circuit can be reduced compared to the linked operation shown in FIG. 5.

Figure 7:
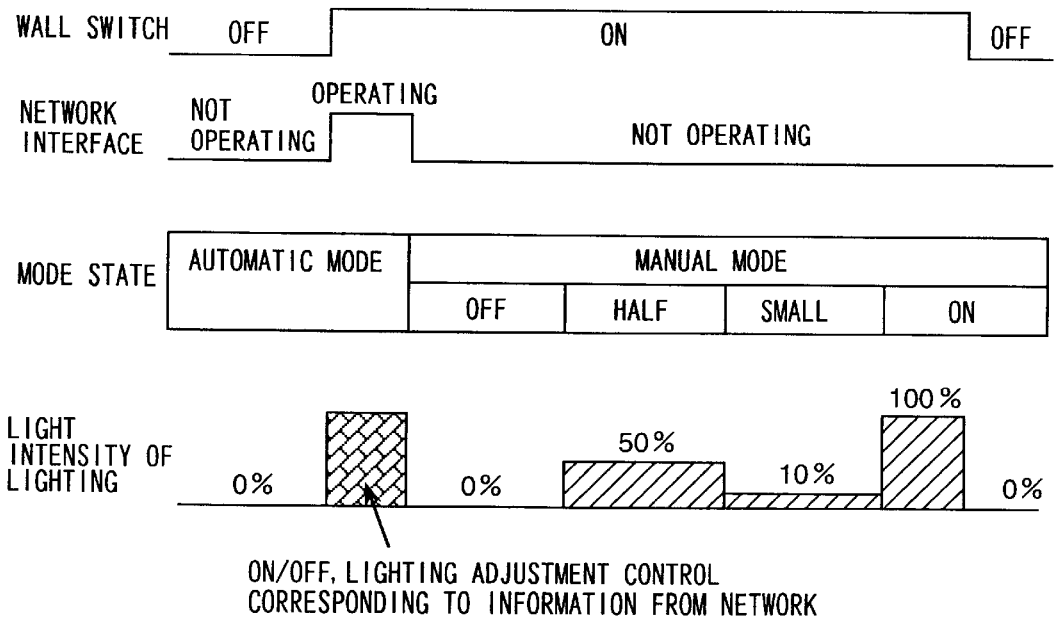
FIG. 7 is an explanatory chart showing a third embodiment of linked operation of the network-ready lighting apparatus.

FIG. 7 is an explanatory chart showing a third embodiment of linked operation of the network-ready lighting apparatus. A different point in this embodiment from FIG. 5 and FIG. 6 is in operation of the network interface circuit.

In the network interface circuit of FIG. 7, the low power consumption operating state in FIG. 6 is changed to not-operating state. Therefore, in the manual mode, electric power consumption of the network interface circuit can be suppressed low.

When the mode state is changed from the manual mode to the automatic mode under the condition that the wall switch is on, the network interface circuit newly starts communication to collect information of the network and then the mode state is shifted to the automatic mode based on the information.

According to the present embodiment, in the case where the lighting apparatus is used in the manual mode, there is the effect that the electric power consumption of the network interface circuit can be further reduced compared to the linked operation shown in FIG. 6.

Figure 8:
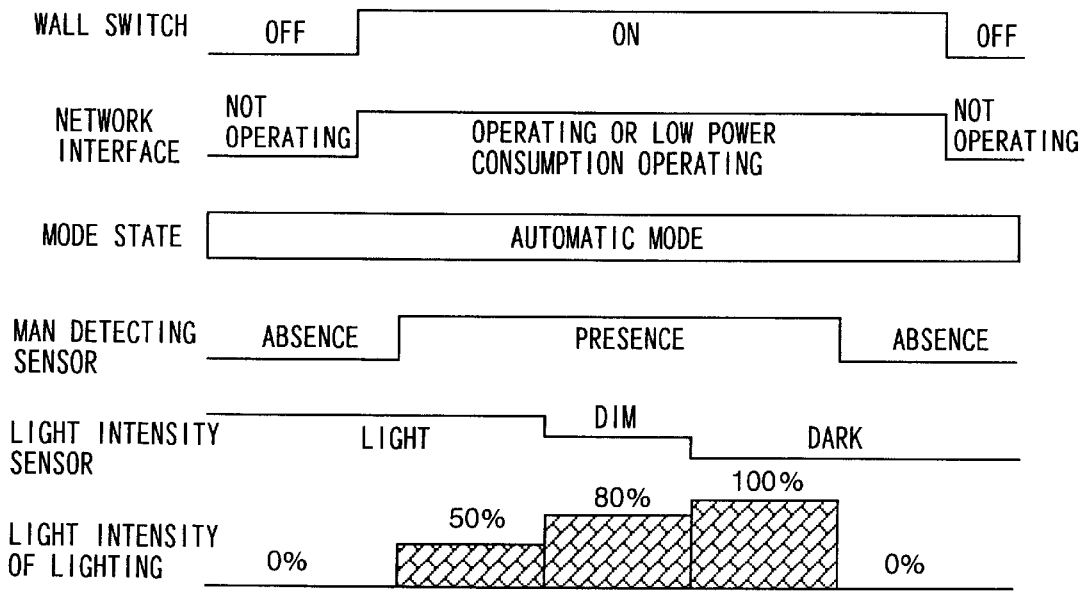
FIG. 8 is a detailed chart showing linked operation of the network-ready lighting apparatus during automatic mode operation.

FIG. 8 is a detailed chart showing linked operation of the network-ready lighting apparatus during automatic mode operation. The mode state is shown as the automatic mode in the whole range. Here, in order to show the linked operation with the sensors, output information from the man detecting sensor and information from the light intensity sensor connected to the network are also shown.

When the man detecting sensor indicates absence on the assumption that the wall switch is on, the light intensity of lighting shows 0% regardless of the state of the light intensity sensor. When the man detecting sensor detects presence of a man, the lighting apparatus is constructed so that the light intensity may be changed in three levels (50% , 80%, 100%) corresponding to the three levels of the light intensity sensor.

Although only the linkage with sensors has been described in FIG. 8, the lighting apparatus can be operated by linking with the other lighting apparatus and various kinds of sensors, and further with home electric appliances other lighting apparatuses connected to the network. Further, it has assumed that the output state of the light intensity sensor is of three-level and the corresponding light intensities of lighting are 50% , 80% and 100%. However, the output states of the light intensity sensor and the light intensity of lighting are not limited to the above, and can be freely set.

According to the present embodiment, since the lighting apparatus can be elaborately controlled by linking with the sensors and the home electric appliances connected to the network, energy saving and amenity of the user can be realized.

Figure 9:
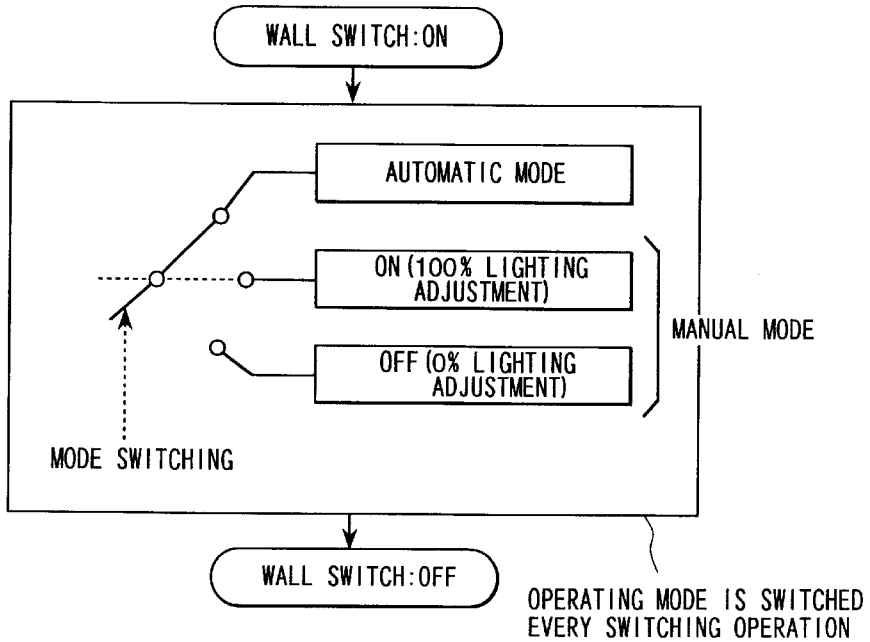
FIG. 9 is an explanatory chart showing a first embodiment of mode switching operation of the network-ready lighting apparatus.

FIG. 9 is an explanatory chart showing a first embodiment of mode switching operation of the network-ready lighting apparatus.

FIG. 9 shows that when the wall switch is switched on, the lighting control is performed in a set mode by the mode switching means. Herein, it is assumed that the mode switching means is mechanically switched, and the mode switching position can not be reset even if the wall switch is turned off. When the wall switch is turned on next time, the lighting control is performed base on the mode switching position set at that time.

The modes shown in the figure are three kinds of an automatic mode, a manual-on mode and a manual-off mode, but number and kinds of modes may be freely set.

According to the present embodiment, since a precedent mode can be kept until the user performs mode switching operation even if the user repeats turning on and off the wall switch, the mode switching operation is simple and easily understandable.

Figure 10:
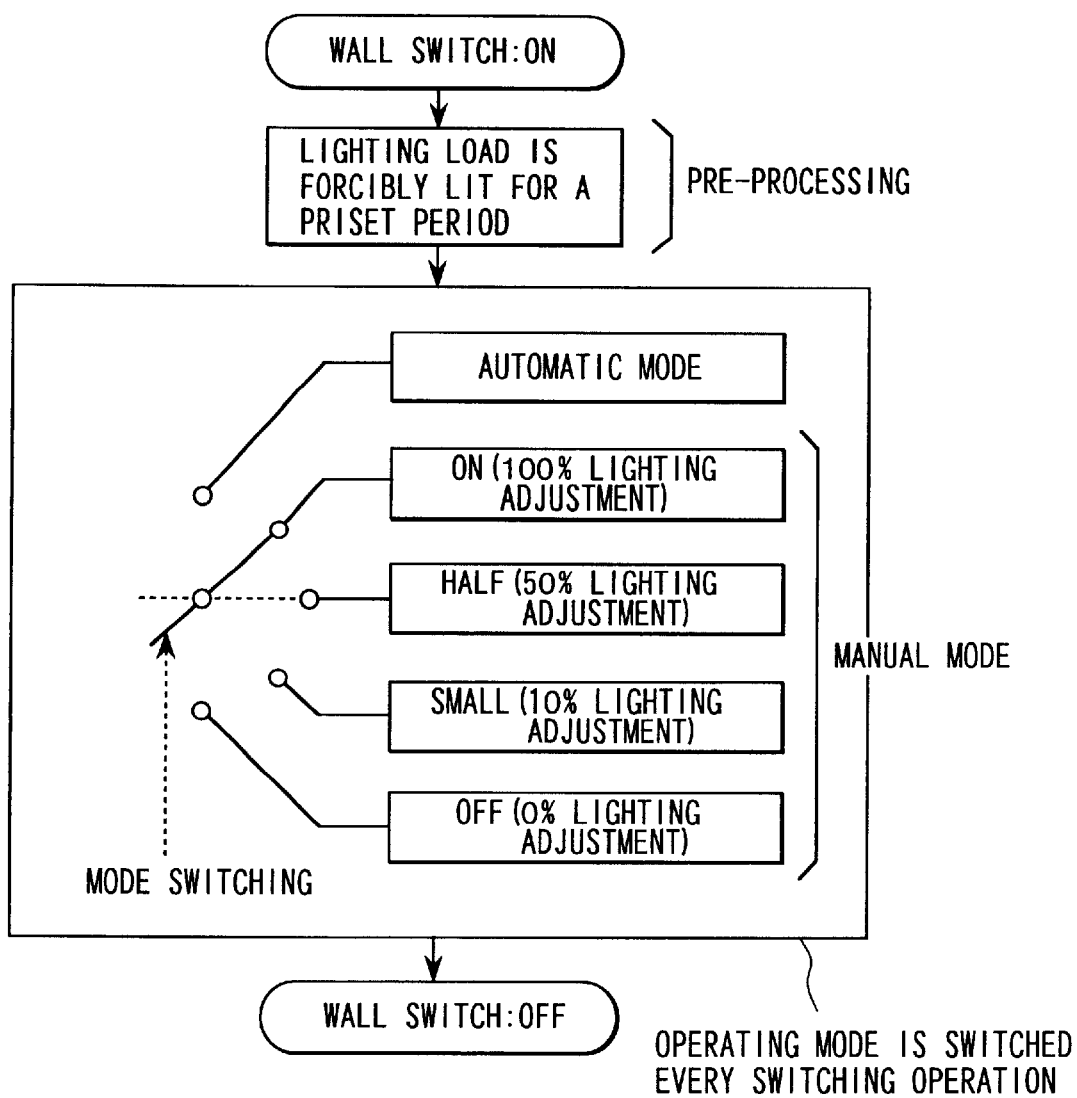
FIG. 10 is an explanatory chart showing a second embodiment of mode switching operation of the network-ready lighting apparatus.

FIG. 10 is an explanatory chart showing a second embodiment of mode switching operation of the network-ready lighting apparatus.

Different points of FIG. 10 from FIG. 9 are that there is a pre-processing process just after the wall switch on process, and that number of kinds of mode switching is increased.

The pre-processing is that the lighting load is forcibly turned on for a preset time period just after the wall switch is switched on. After elapsing the preset time period, the operating mode is shifted to a mode which has been set by the mode switching means. The time period of forcibly turning on the lighting load may be changed depending on liking of the user.

In a case where the operating mode has been set to the manual-off mode at a dark time zone such as night, if such pre-processing is not provided, an action of the user will be disturbed because the lighting load is not lit when the wall switch is turned on. Therefore, by providing the pre-processing process, operation of the wall switch can be comfortably performed in a dark place at night. During the pre-processing period, the user can change the set mode of the lighting apparatus to a desired mode.

Figure 11:
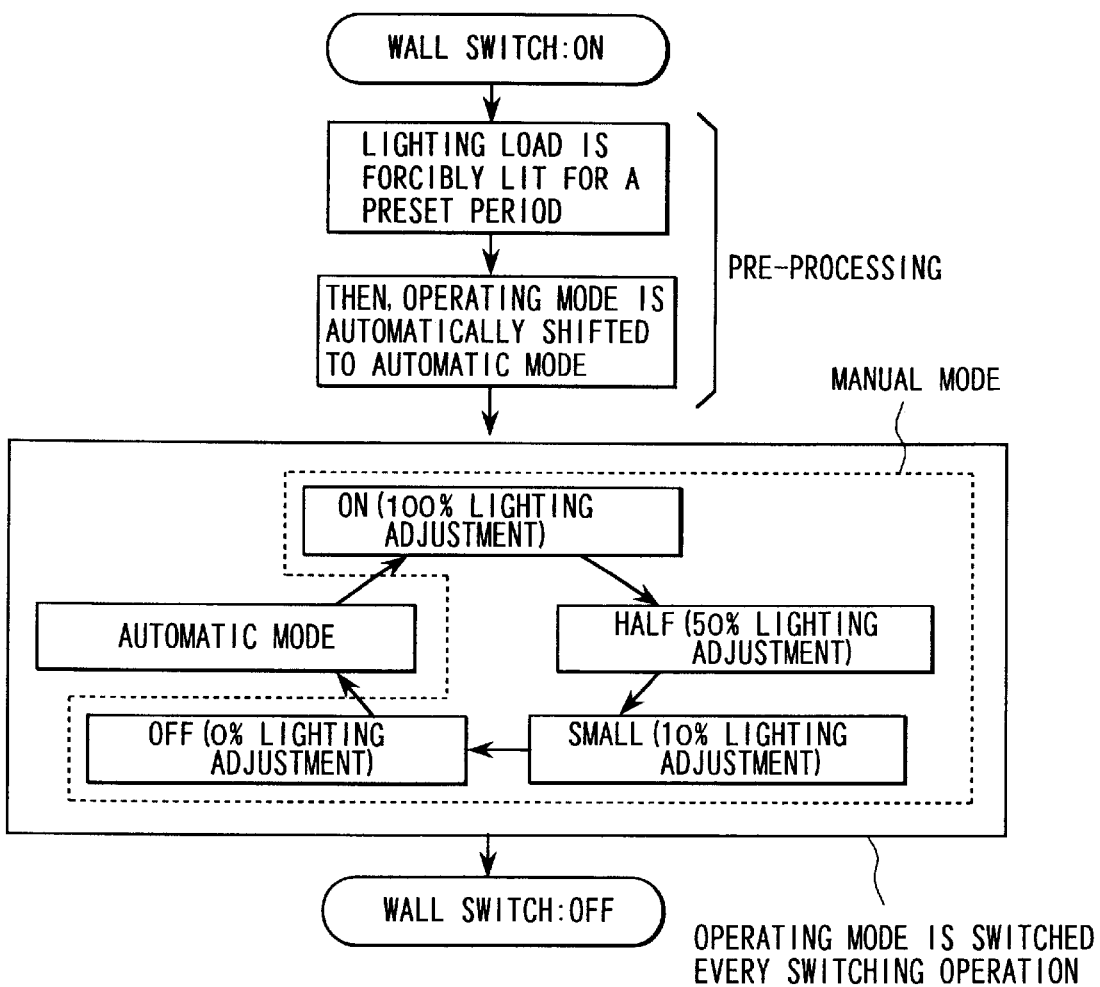
FIG. 11 is an explanatory chart showing a third embodiment of mode switching operation of the network-ready lighting apparatus.

FIG. 11 is an explanatory chart showing a third embodiment of mode switching operation of the network-ready lighting apparatus.

The embodiment of FIG. 11 is that a process of automatically shifting the operating mode to the automatic mode is added to the embodiment of FIG. 10. Further, the switching of operating mode is started from the automatic mode, and the operating mode can be changed by the mode switching means when the used want to change the operating mode.

Switching of the mode can be performed by operating a switch with a cord attached to the lighting apparatus or a remote controller.

According to the present embodiment, a default operating mode at switching on the wall switch can be automatically set to the automatic mode. Therefore, to a user who turns out the lighting apparatus by switching off the wall switch, the user can use the lighting apparatus as the network-ready lighting apparatus without consciousness when the wall switch is turned on next.

Accordingly, the user can receive the effects of convenience and energy saving. To a user who frequently uses the manual operation, the operating mode can be switched to the manual operation at once just after turning on the wall switch.

Since after operating the wall switch the user is moving in the room in most cases, the user may directly move to a place of the lighting apparatus to manually operate the lighting apparatus. By doing so, to the user who frequently uses the manual operation, the lighting apparatus can be used without incongruity with conventional lighting equipment.

Figure 12:
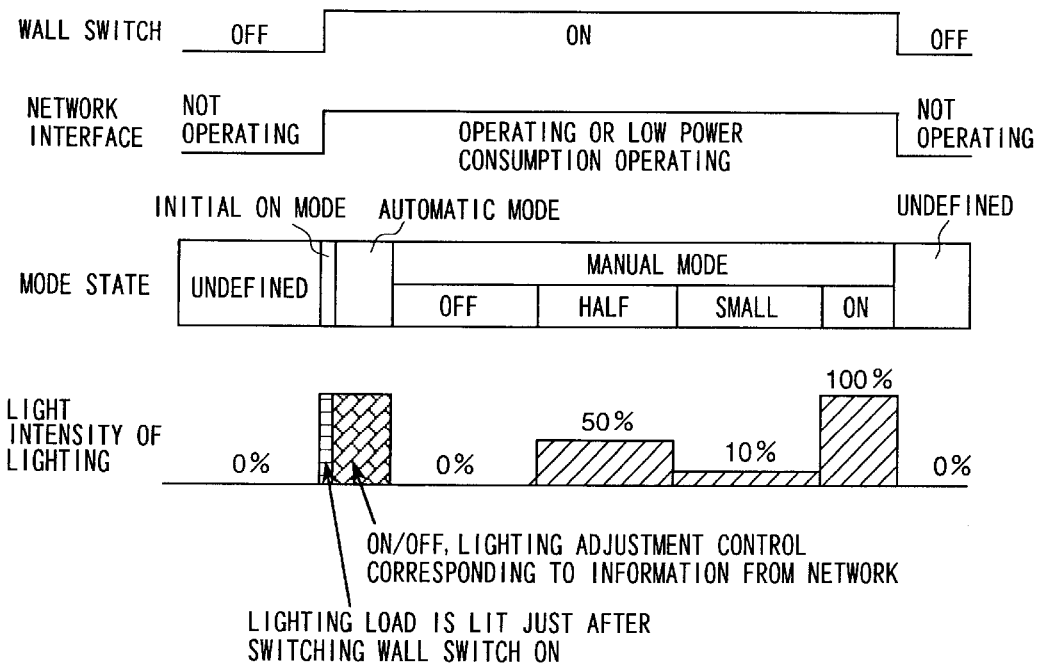
FIG. 12 is a chart explaining the linked operation of the mode switching operation shown in FIG. 11.

FIG. 12 is a chart explaining the linked operation of the mode switching operation shown in FIG. 11.

When the wall switch is in the off state, the mode state is undefined. Since it is assumed here that the mode switching means is of an electric type, the mode state is in the undefined state during the time when the wall switch is off because electric power is not supplied to the lighting apparatus and accordingly the electric power is not supplied to the mode switching means either.

When the wall switch is changed from the off state to the on state, the mode state is shifted to an initial on mode to start initial lighting with an arbitrary light intensity of lighting. The initial on mode is automatically shifted to the automatic mode after elapsing a preset time. In the automatic mode, the lighting control is performed based on information from the network. Then, if the user changes the mode, lighting control is performed by the set mode. These operation are pre-programmed.

The present embodiment has the same effects as the embodiment of FIG. 11.

Figure 13:
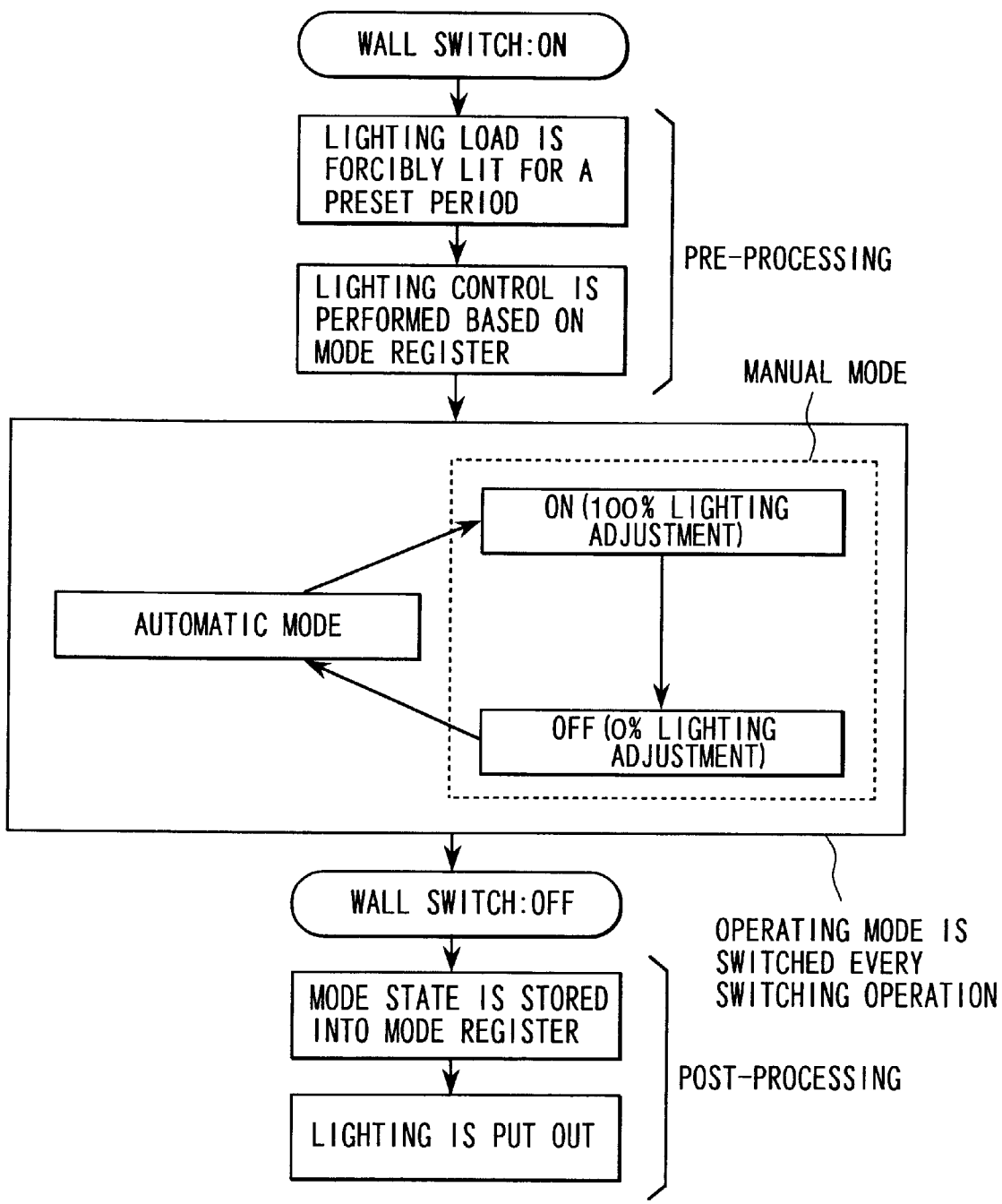
FIG. 13 is an explanatory chart showing a fourth embodiment of mode switching operation of the network-ready lighting apparatus.

FIG. 13 is an explanatory chart showing a fourth embodiment of mode switching operation of the network-ready lighting apparatus.

The embodiment of FIG. 13 is that a pre-processing process is added after switching on the wall switch, and a post-processing process is added after switching off the wall switch.

In the present embodiment, the lighting load is forcibly turned on after switching on the wall switch, and then based on contents of the mode register, an operating mode is set and the lighting control is performed. In the lighting apparatus, the operating mode is sequentially switched from the operating mode set in the mode register every time of controlling the mode switching means.

After turning off the wall switch, a state of the mode set at that time is stored in the mode register and then the lighting apparatus is turned off. The storing of the mode state to the mode register can be performed even after switching off the wall switch because a self-contained battery can be used.

According to the present embodiment, the operating mode at switching off the wall switch is stored, and then at the time when the wall switch is switched on next, the lighting control can be performed using the precedent mode at switching off the wall switch. Therefore, usability of the user can be further improved.

Figure 14:
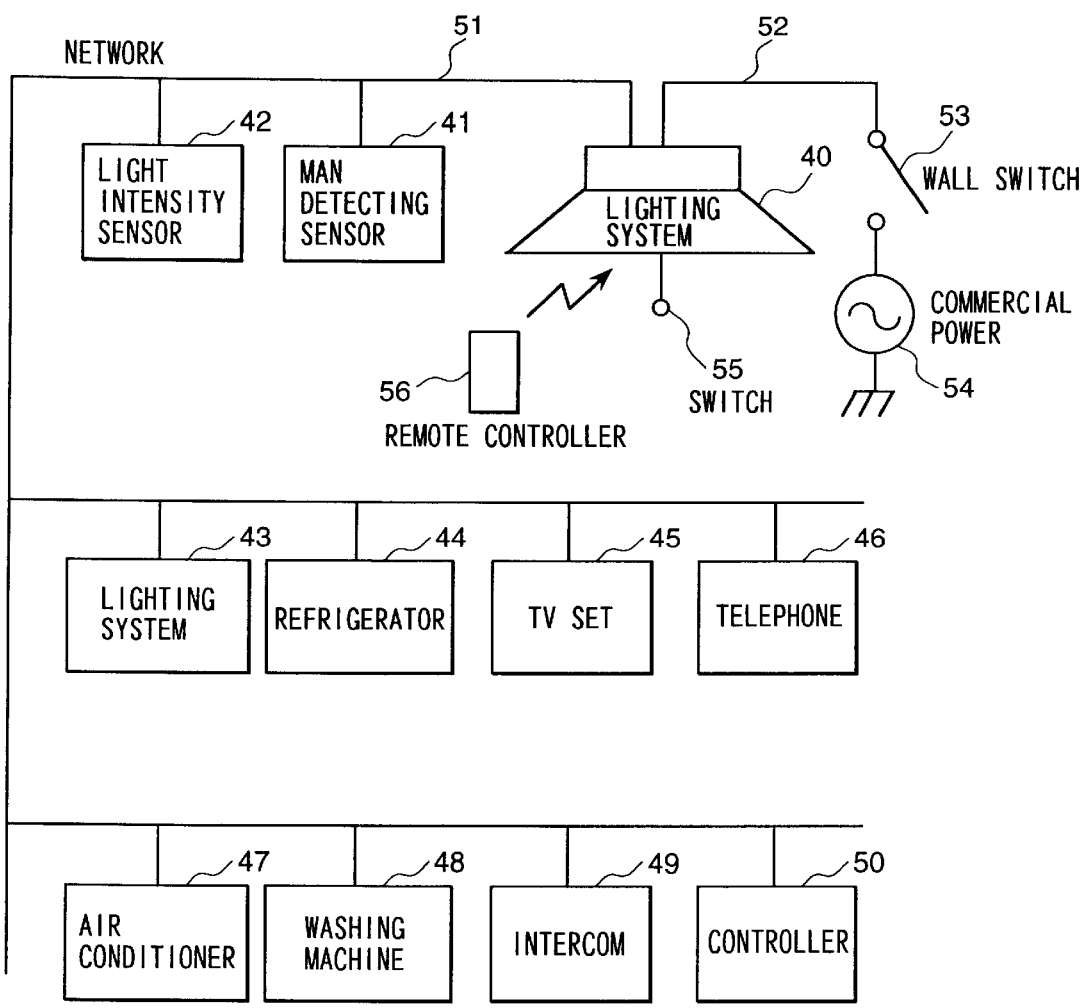
FIG. 14 is a block diagram showing a first embodiment of a system structure in which home electric appliances in home are connected using a network.

FIG. 14 is a block diagram showing a first embodiment of a system structure in which home electric appliances in home are connected using a network. A lighting apparatus 40, a man detecting sensor 41, a light intensity sensor 42, a lighting apparatus 43, a refrigerator 44, a television set 45, a telephone 45, an air conditioner 47, a washing machine 48, an intercom 49 and a controller 50 are connected to a network 51.

Further, for the purpose of simplifying explanation, only an electric power line 52 connected to the lighting apparatus 40 is shown in the figure. Further, the operating mode of the lighting apparatus 40 can be changed using a switch with a cord 55 or a remote controller 56.

According to the present embodiment, the lighting apparatus and the various kinds of sensors and the home electric appliances other than the lighting apparatus connected to the network 51 are cooperated with one another to be able to attain energy saving and amenity the user. The linked operation of the man detecting sensor 41, the light intensity sensor 42, the wall switch 53 and the lighting apparatus 40 is the same as that described previously. The linked operation with the other home electric appliances is to be described later.

In the present embodiment, in addition to the white goods group home electric appliances, the audiovisual group home electric appliances such as the television set and the telephone 46 are connected to the one network. In regard to the television set 45, sound data and moving picture data are transmitted through the network 51. By connecting the telephone 46 to the network 51, the home electric appliance can be controlled by telephoning from the outside. The controller 50 can perform further, centralized control of the home electric appliances in the house.

The system block diagram shown here shows one example, and accordingly the kinds of the home electric appliances connected to the network are not limited to the above.

Figure 15:
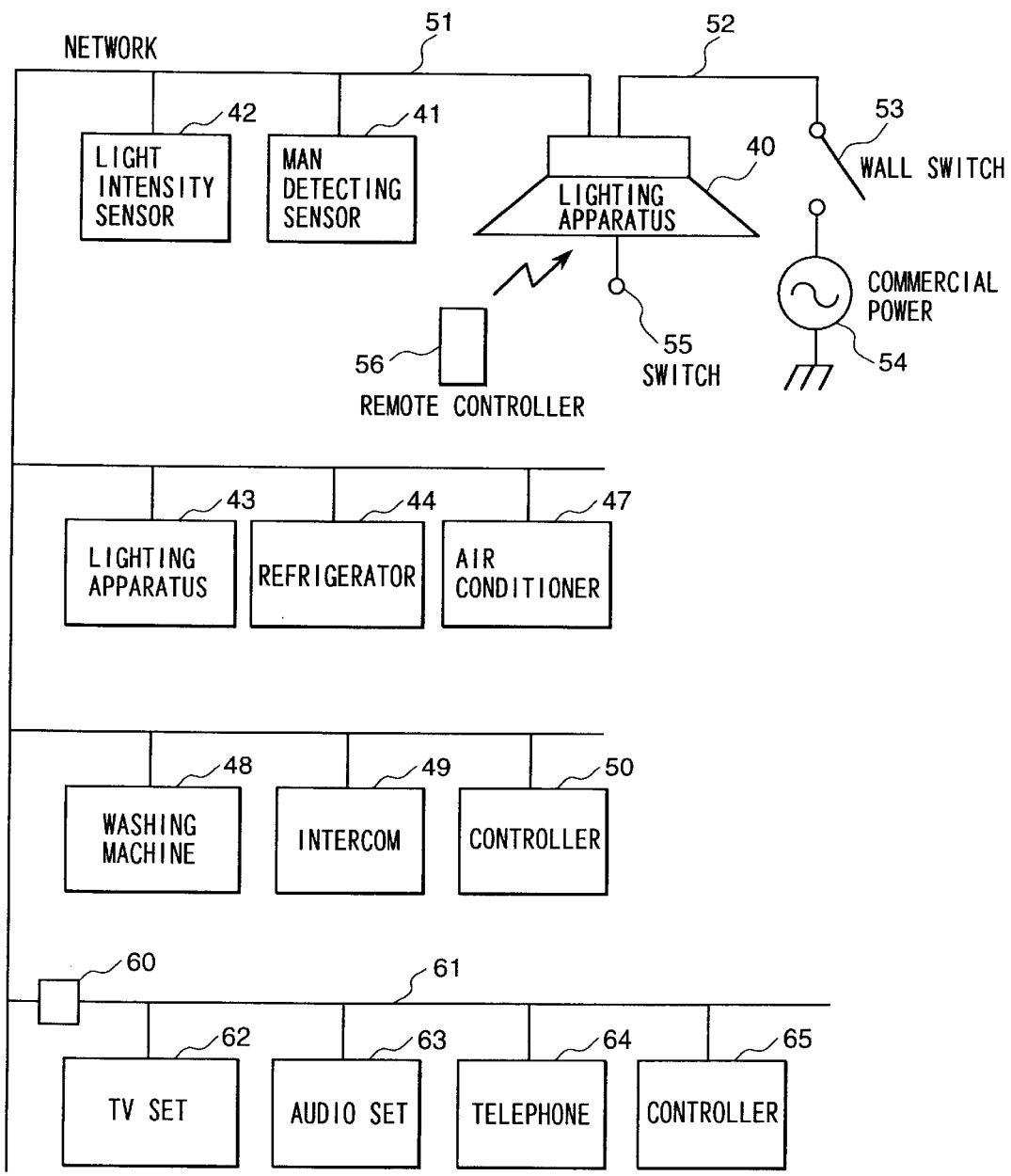
FIG. 15 is a block diagram showing a second embodiment of a system structure in which home electric appliances in home are connected using a network.

FIG. 15 is a block diagram showing a second embodiment of a system structure in which home electric appliances in home are connected using a network. A lighting apparatus 40, a man detecting sensor 41, a light intensity sensor 42, a lighting apparatus 43, a refrigerator 44, an air conditioner 47, a washing machine 48, an intercom 49 and a controller 50 are connected to a network 51. Further, the network 51 is connected to anther network 61 through a gateway 60. A television set 62, an audio set 63, a telephone 64 and a controller 65 are connected to the network 61.

The network 51 is made of a low speed network for controlling the white goods group home electric appliances, and the network 61 is made of a high speed network for controlling the audiovisual group home electric appliances. Further, data communication between information in the low speed group network 51 and information in the high speed group network 61 is performed through the gateway 60.

The controller 50 controls mainly the home electric appliances connected to the network 51, and the controller 65 controls mainly the home electric appliances connected to the network 61. However, the controller 50 may control the home electric appliances connected to the network 61 through the gateway 60, if necessary. On the contrary, the controller 65 may control the home electric appliances connected to the network 51 through the gateway 60.

According to the present embodiment, by separating the low speed group network 51 and the high speed group network 61 from each other through the gateway 60, a transmission medium and a communication protocol optimum to each of the networks can be selected. Therefore, there is an effect that the home network good in the cost performance can be formed.

Figure 16:
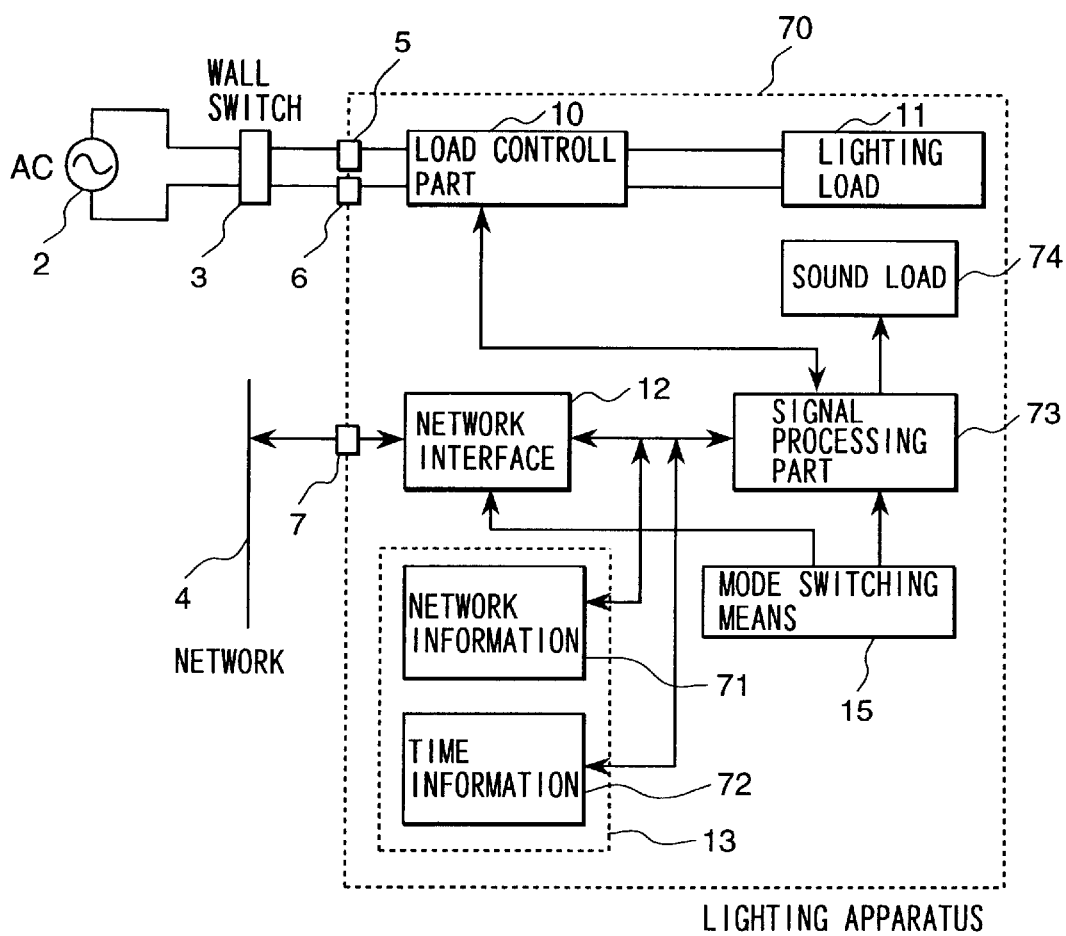
FIG. 16 is a block diagram showing a fourth embodiment of a lighting apparatus in accordance with the present invention.

FIG. 16 is a block diagram showing a fourth embodiment of a lighting apparatus in accordance with the present invention. In the figure, the reference character 70 is a lighting apparatus, the reference character 71 is a network information memory means for mainly storing network information, and the reference character 72 is a time information memory means for mainly storing time information.

The time information means absolute time such as date and time, relative time such as hours after now, and count information such as a pulse after coming how many pulses from the beginning in a clock oscillator or in a commercial electric power frequency. The memory means 71 and 72 may be separately provided, or may be allocated to different addresses inside the memory means 13.

The reference character 73 is a signal processing part which is capable of controlling a sound load 74 to output sound. The sound load is formed of, for example, a speaker or a buzzer, and a sound load control circuit is contained in the signal processing part 73.

Therefore, the signal processing part 73 is capable of controlling the lighting load 11 and the sound load 74 at a time or separately. Further, the signal processing part 73 is capable of controlling these loads using the time information.

According to the present embodiment, the lighting apparatus and the sound load can be controlled by linking with the other lighting apparatus, the various kinds of sensors and the home electric appliances other than the lighting apparatus connected to the network to improve the display effect and at the same time to improve amenity of the user.

Further, since information can be conveyed to a handicapped person such as a hearing handicapped person and a visual handicapped person by light and sound in linking with the various kinds of home electric appliances, the living can be made convenient.

Furthermore, a time length until light of the lighting apparatus is put out can be controlled regardless of the automatic and the manual operating modes by using the time information stored in the time information memory means 13. At that time, it is the premises that the wall switch is in the on state.

Figure 17:
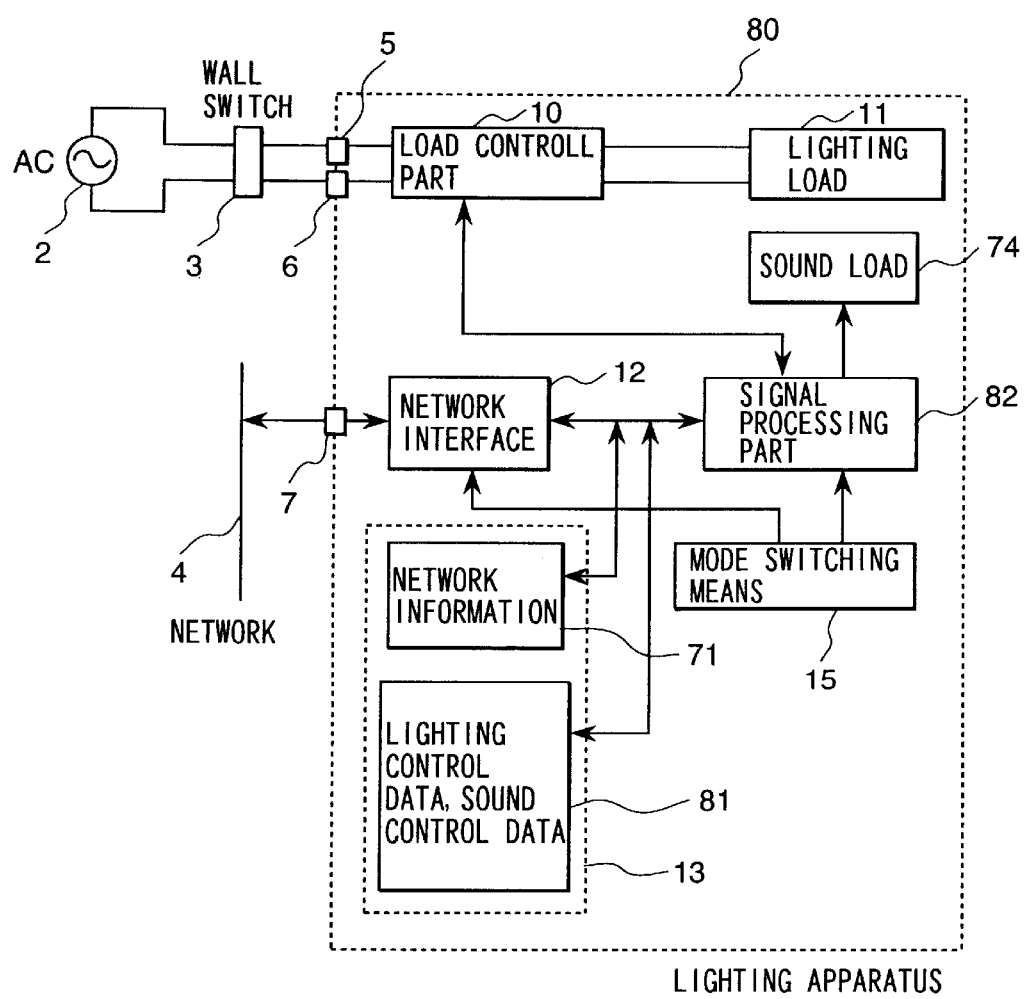
FIG. 17 is a block diagram showing a fifth embodiment of a lighting apparatus in accordance with the present invention.

FIG. 17 is a block diagram showing a fifth embodiment of a lighting apparatus in accordance with the present invention.

In the figure, the reference character 80 is a lighting apparatus, the reference character 81 is a data memory means for mainly storing lighting control data and sound control data, and the reference character 82 is a signal processing part which controls various kinds of components such as a lighting load and a sound load. Memory means 71 and 81 may be separately provided, or may be allocated to different addresses inside the memory means 13.

In the present embodiment, by storing flashing patterns of the lighting load 11 and sound control patterns of the sound load 74 in the data memory means 81, the data of the data memory means 81 is read out corresponding to information from the network 4 to be able to control the lighting load 11 or the sound load 74 based on the read-out data. In addition, the data in the data memory means 81 may be rewritten through the network 4. Thereby, the user can capture desired control data through the network to control the lighting load or the sound load.

Figure 18:
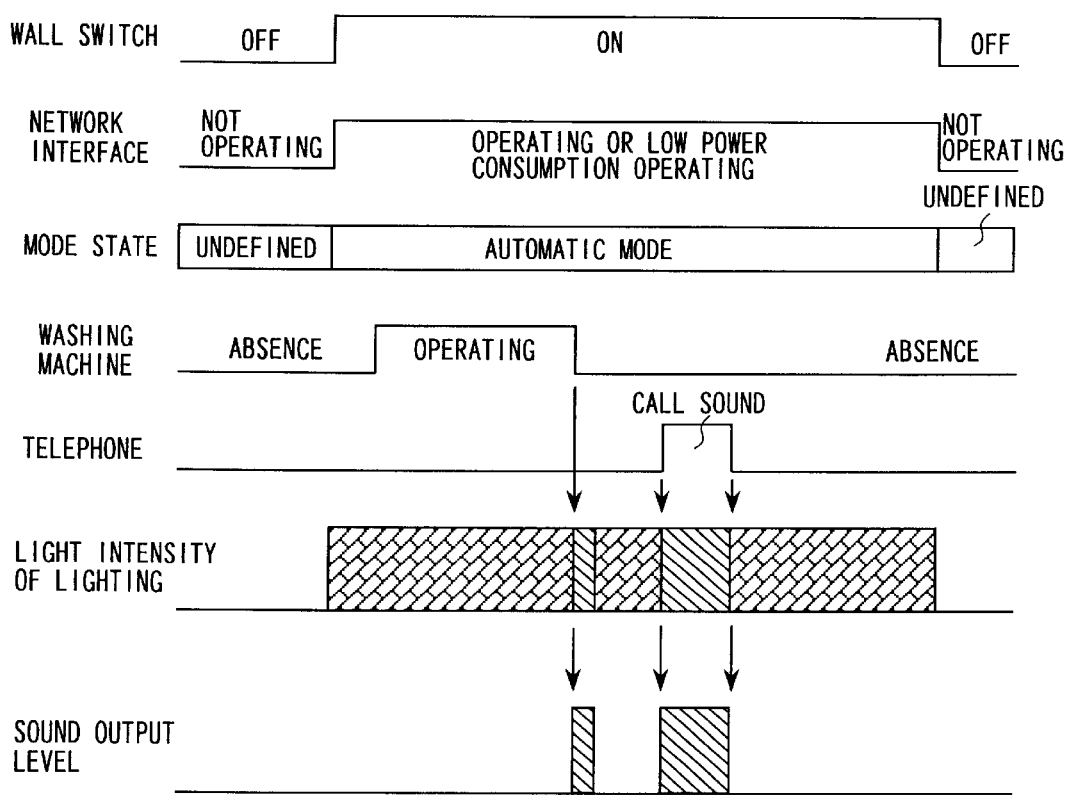
FIG. 18 is an explanatory chart showing a fourth embodiment of linked operation of the network-ready lighting apparatus.

FIG. 18 is an explanatory chart showing an embodiment of operation of the network-ready lighting apparatus shown in FIG. 17 in linking with the various kinds of home electric appliances. Therein, the mode state of the lighting apparatus is assumed to be the automatic mode, and change in the light intensity of lighting and change in the sound output by linked operation with the washing machine and the telephone are shown.

The light intensity of lighting is operated by linking with the washing machine and the home electric appliances other than the telephone at the automatic mode operation, and therein the light intensity of lighting and the sound output level are changed for a preset time period by linking with the completion of operation (washing) of the washing machine.

In the other hand, during sounding call sound of the telephone, the light intensity of lighting and the level of sound output are changed. By doing so, the user can understand the completion of washing or the receipt of the telephone call from the light intensity of lighting and the level of sound output whichever room the user is in.

At that time, the light intensity of lighting and the level of sound output changed by linking with the washing machine are different from the light intensity of lighting and the level of sound output changed by linking with the telephone in changing patterns. Thereby, it is possible to provide the user with better usability of the system.

Linked operation with various kinds of home electric appliances other than the above (application) can be considered. Some of the examples will be described below. For example, light and sound notify a resident of presence of a visitor by linking with an intercom. During enjoying a movie, light intensity and color of lighting are changed by linking with an audiovisual unit such as a television set to improve the stage effect.

Light and sound are changed to notify a resident of reaching of an appropriate water temperature or water level of bath by linking with a water level sensor and a temperature sensor. Light of a lighting apparatus and sound are changed to notify a resident of entering of a suspicious character by linking with antitheft devices installed outdoor and indoor. Light and sound of all lighting apparatuses in automatic mode operation connected to a network in a house are changed to notify a resident of occurrence of fire.

Figure 19:
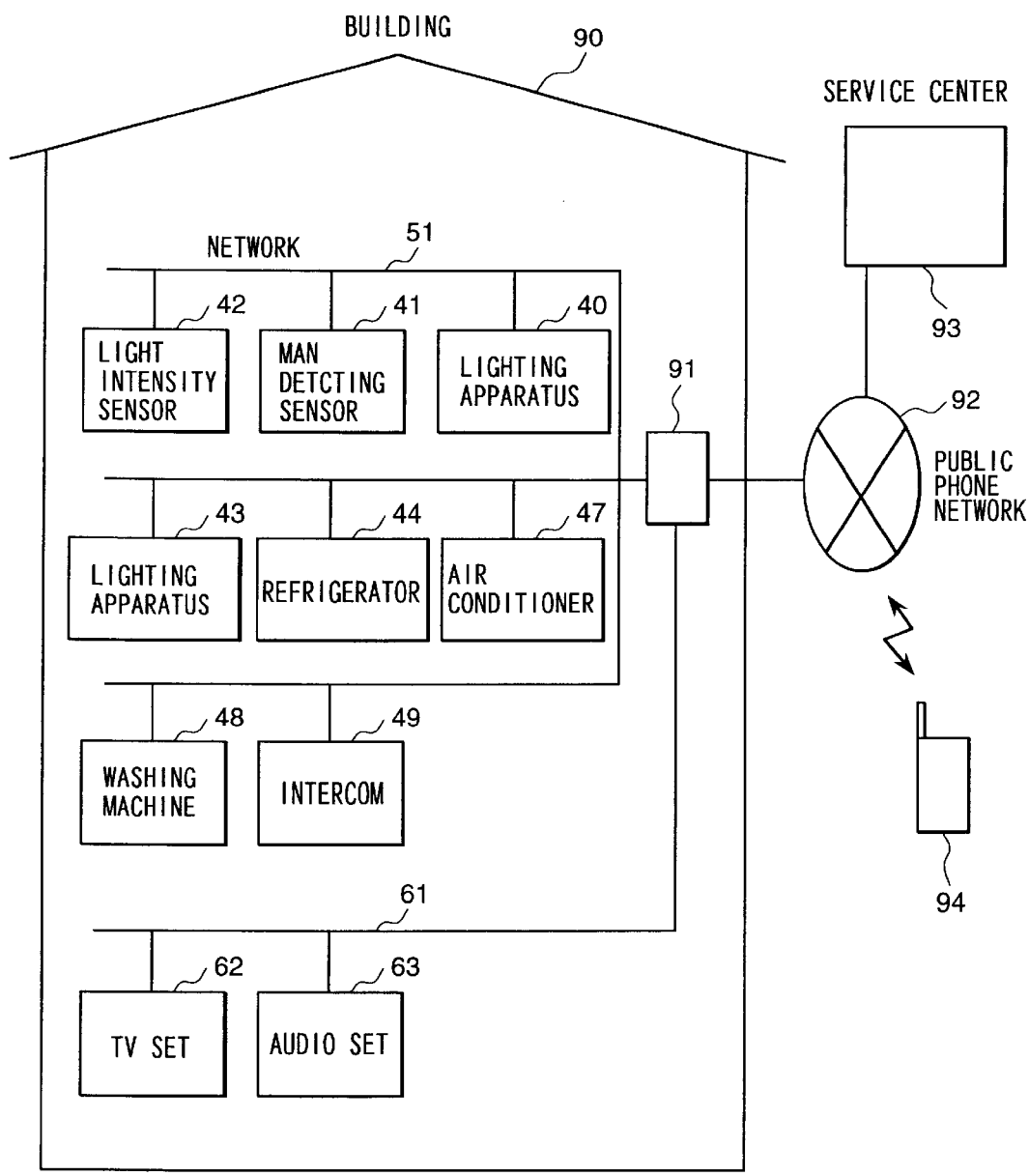
FIG. 19 is a block diagram showing a system structure in which a network in home is connected to a public phone network.

FIG. 19 is a block diagram showing a system structure in which a network in home is connected to a public phone network.

The reference character 90 is a building such as a house, and the reference character 91 is a gateway which converts communication protocol and has a function of controller for home electric appliances. The reference character 92 is a public phone network, and the reference character 93 is a service center which is a facility for providing service to each home using the public phone network. The reference character 94 is a connecting device to the public phone network such as a cellar phone.

According to the present embodiment, the user can control and monitor operations various kinds of home electric appliance in his own house and can monitor the inside of the house using information from sensors by connecting the cellar phone or the like from the outside of the house to the gateway 91 in the house through the public phone network. In addition, the user can receive services such as monitoring of the inside of the house and maintenance of the home electric appliances by requesting a service company.

According to the present invention, the following effects can be attained.

(a) Improvements in amenity of the user and in energy saving can be attained.

(b) The lighting apparatus can be controlled as the user desires.

(c) Operability of the user can be improved.

(d) Increase in the electric power consumption of the peripheral circuits due to networking can be suppressed.

The network-ready lighting apparatus can be easily installed not only in a new house but also in an existing house.

What is claimed is:

1. A lighting apparatus connected to a network and controlling a lighting load corresponding to information from said network comprising:
    a network interference circuit for sending and receiving signals to said network; and
    a switching means for switching between an automatic mode for controlling the lighting load corresponding to the information from said network and a manual mode for controlling the lighting load independently of the information from said network.

2. A lighting apparatus according to claim 1, wherein state information inside the lighting apparatus is communicable to said network.

3. A lighting apparatus according to claim 2, wherein said state information inside the lighting apparatus includes at least any one of a detected signal of lighting load lifetime, information on a state of automatic/manual mode and information on an amount of power consumption.

4. A lighting apparatus according to claim 1, which comprises a memory means for storing signals from said network.

5. A lighting apparatus according to claim 4, wherein the state is switched from said manual mode to said automatic mode, said lighting load is controlled by reading said signal from said memory means.

6. A lighting apparatus according to claim 1, wherein said network interface circuit comprises a means which switches an operating state of said network interface circuit to a power-saving state when communication to said network does not exist.

7. A lighting apparatus according to claim 6, wherein operating mode of said network interface circuit is switched to the power-saving state by interlocking with an automatic/manual mode switching signal.

8. A lighting apparatus according to claim 6, wherein on-off operation of communication of said network interface circuit is controlled by interlocking with the automatic/manual mode switching signal.

9. A lighting apparatus according to claim 1, wherein said lighting apparatus and at least one load of a sensor and a home electric appliance are connected to said network, wherein
    electric power is supplied to said lighting apparatus when an electric power supply signal is input to said lighting apparatus, and said lighting apparatus starts to communicate with said load connected to said network.

10. A lighting control system according to claim 9, wherein when electric power is supplied to said lighting apparatus by inputting an electric power supply signal to said lighting apparatus from the external, said lighting load is put on for a preset time period irrespective of said automatic mode and said manual mode.

11. A lighting control system according to claim 10, wherein
    when electric power is started to be supplied to said lighting apparatus, the lighting load, to which electric power has been supplied for the preset time period, is automatically switched to the automatic mode operation.

12. A lighting control system, wherein in the lighting apparatus according to claim 1, the lighting apparatus connected to said network controls said lighting load based on time information input from said network during said automatic mode operation.

13. A lighting apparatus connected to a network and controlling a lighting load corresponding to information from said network comprising:

an automatic mode for controlling the lighting load corresponding to the information from said network;

a manual mode for controlling the lighting load independently of the information from said network;

a switching means for switching between said automatic mode and said manual mode; and a network interface circuit for performing input and output communication of information to and from said network, wherein said network interface circuit performs input and output communication to and from said network with appropriate timing when said manual mode is set.

14. A lighting apparatus connected to a network and controlling a lighting load corresponding to information from said network comprising:

an automatic mode for controlling the lighting load corresponding to the information from said network;

a manual mode for controlling the lighting load independently of the information from said network; and a switching means for switching between said automatic mode and said manual mode;

wherein when the lighting load in the lighting apparatus is put out irrespective of operation of said automatic mode and said manual mode, a time period until said lighting load is completely put out can be set by time information received from said network.

15. A lighting apparatus connected to a network to control a lighting load corresponding to information from said network, which comprises a memory means, wherein said lighting load is controlled by invoking control data for changing or altering brightness of lighting stored in said memory means based on information from a communication network.

16. A lighting apparatus connected to a network to control a lighting load corresponding to information from said network, which comprises:

a sound load for outputting sound; and a sound load control means which controls said sound load based on the information from said network and outputs a control signal to said sound load.

17. A lighting control system, comprising:

a lighting apparatus connected to a network to control a lighting load corresponding to information from said network, which comprises:

a sound load for outputting sound;

a sound load control means which controls said sound load based on the information from said network and outputs a control signal to said sound load;

a home electric appliance and a sensor connected to the network; and wherein said lighting control system, said lighting apparatus receives information from said home electric appliance and said sensor through the network, and by linking with said home electric appliance and said sensor, through said received information a lighting load and said sound load in said lighting apparatus is controlled.

18. A home electric appliance which is connected to a network and controls a lighting load corresponding to information from said network comprising:

a network interference circuit for sending and receiving signals to said network;

an automatic mode to control the load corresponding to the information from said network;

a manual mode to control the load independently of the information from said network; and a switching means for switching between said automatic mode and said manual mode.

19. A home electric appliance according to claim 18, wherein state information inside the home electric appliance is communicable to said network.

20. A home electric appliance according to claim 18, which comprises a memory means for storing signals from said network.

* * * * *